Aug. 14, 1951  W. J. MARTIN  2,564,491
RAT TRAP
Filed March 6, 1946

Inventor
Walter J. Martin,

By Clarence A. O'Brien
and Harvey B. Jacobson
Attorneys

Patented Aug. 14, 1951

2,564,491

UNITED STATES PATENT OFFICE 2,564,491

RATTRAP

Walter J. Martin, Pittsburgh, Pa.

Application March 6, 1946, Serial No. 652,415

1 Claim. (Cl. 43—60)

This invention relates to new and useful improvements and structural refinements in rat traps, and the principal object of the invention is to provide a device of the character herein described in which the bait is not consumed by the rodent and, therefore, may be repeatedly used.

A further object of the invention is to provide a rat trap which, if desired, may be employed to catch the rodent alive.

Another object of the invention is to provide a rat trap which is of very simple construction and which will readily lend itself to economical manufacture.

With the above more important objects in view, and such other objects as may become apparent as this specification proceeds, the invention consists essentially of the arrangement and construction of parts as illustrated in the accompanying drawings, in which.

Like characters of reference are used to designate like parts in the specification and in the several views.

Figure 1:
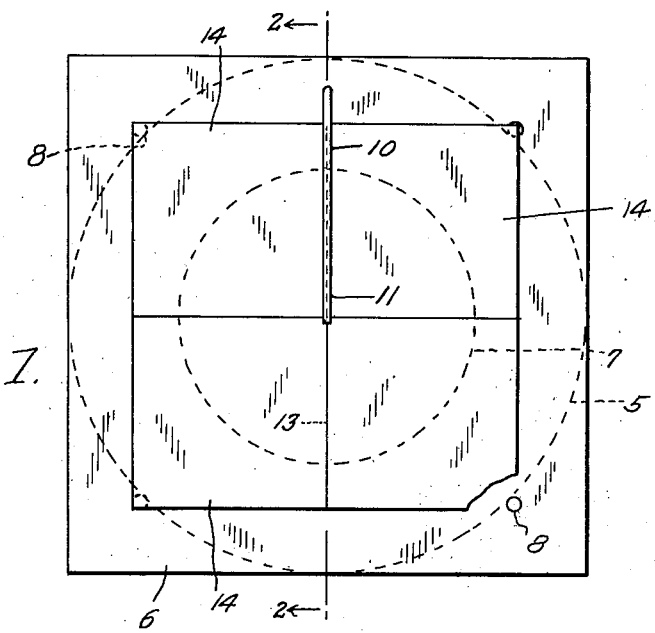
Figure 1 is a top plan view of the invention.
Figure 2:
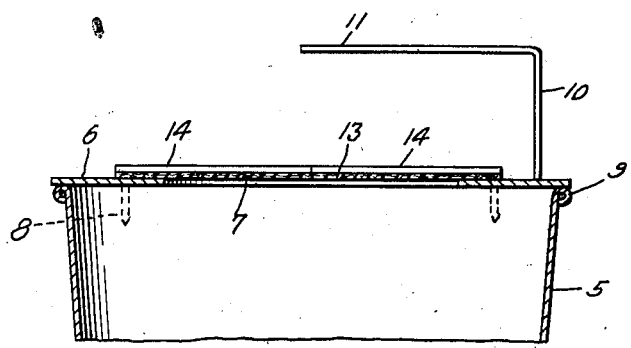
Figure 2 is a cross sectional view, taken in the plane of the line 2—2 in Figure 1.

Referring now to the accompanying drawing in detail, the invention consists of a suitable receptacle 5, open at the top thereof, such as may assume the form of a conventional household pail or the like.

A platform 6, provided with the opening 7, is removably positioned on the open top of the receptacle 5, and is conveniently retained thereon by means of a plurality of projecting pins 8. The latter are provided on the underside of the platform 6 and engage the upper edge 9 of the receptacle 5, as will be clearly apparent from the accompanying drawings.

An angulated arm 10 is secured at one end thereof to the platform 6, the remaining end 11 of this arm extending over the opening 7.

A collapsible mask designated generally by the reference numeral 13 is positioned on the platform 6, the mask comprising a sheet of paper, preferably tissue paper, covering the opening 7. A cardboard sheet is positioned on this paper, such sheet consisting of a plurality of complemental sections or panels 14, arranged edge to edge and extending radially from substantially the center of the opening, as is best illustrated in the accompanying Figure 1.

When the invention is placed in use, suitable bait (not shown) is positioned on the end 11 of the arm 10 and the receptacle 5 is partially filled with water. As the rat approaches the bait, the mask 13 will collapse, thereby dropping the animal into the receptacle through the opening 7. It will be noted that this action will occur before the animal has had the occasion to consume the bait, thus permitting the latter to be repeatedly used.

The purpose of the paper sheet 13 is, of course, to support the panels 14 over the opening 7, and it is to be noted that when the sheet 13 collapses under the weight of an animal on the panels 14, the latter will simply become disarranged rather than broken, and thus available for repeated use.

While in the foregoing there has been shown and described the preferred embodiment of this invention it is to be understood that minor changes in the details of construction, combination, and arrangement of parts may be resorted to without departing from the spirit and scope of the invention as claimed.

What I claim as my invention is:

In a rat trap, the combination of a platform adapted to be positioned on the upper edge of a receptacle and provided with a substantially circular opening, a sheet of paper positioned on said platform and covering said opening, and a plurality of panels positioned on and supported by said sheet, said panels having contiguous edges extending radially from the center of said opening.

WALTER J. MARTIN.

REFERENCES CITED

The following references are of record in the file of this patent:

UNITED STATES PATENTS

| Number | Name | Date |
|---|---|---|
| 83,011 | Waring | Oct. 13, 1868 |
| 484,799 | Johnston | Oct. 25, 1892 |
| 1,192,098 | Nelson | July 25, 1916 |
| 1,258,960 | Swain | Mar. 12, 1918 |
| 1,446,130 | Samuelson | Feb. 20, 1923 |
| 2,123,955 | Oberle | July 19, 1938 |

OTHER REFERENCES

A book entitled "Complete American Trapper" by W. H. Gibson; published by J. Miller, N. Y., 1876, pages 125 and 126, inclusive. (Copy in Div. 2.)